Patented Aug. 25, 1936

2,052,436

UNITED STATES PATENT OFFICE 2,052,436

CALCIUM SULPHATE PRODUCT AND METHOD OF MAKING

Davidson Charlton Wysor, Ridgewood, N. J., assignor to General Chemical Company, New York, N. Y., a corporation of New York No Drawing. Application May 11, 1934, Serial No. 725,101

6 Claims. (Cl. 23—122)

This application relates to calcium sulphate and its production in a new and desirable form from the waste sulphate obtained in the manufacture of hydrogen fluoride.

Calcium sulphate occurs in a number of forms. It is commonly found occuring naturally as gypsum, $CaSO_4.2H_2O$, and anhydrite, $CaSO_4$. It also is obtained as a by-product in numerous processes such as the formation of phosphoric acid by treatment of phosphate rock with sulphuric acid, the formation of acetic acid by treatment of calcium acetate with sulphuric acid, and the formation of hydrofluoric acid by the treatment of calcium fluoride with sulphuric acid.

In the manufacture of phosphoric acid and acetic acid the calcium sulphate obtained is in a hydrated or partially hydrated condition normally occurring as $CaSO_4.2H_2O$ in the first case, and $CaSO_4.\frac{1}{2}H_2O$ in the second.

I have now found that in the manufacture of hydrofluoric acid wherein calcium fluoride (flour spar) in the dry state is treated with about an equimolar quantity of sulphuric acid of around 93% to 98% concentration the resulting calcium sulphate when freshly formed is in very finely divided form due presumably to the absence of water in the reaction whereby the product is substantially anhydrous. I have found that by suitable purification of this anhydrous calcium sulphate, a product may be formed differing materially from other known calcium sulphates and possessing physical properties of extreme fineness and uniformity that render it an especially valuable commercial product. These properties render it especially useful for certain applications where the relative coarseness of ordinary calcium sulphate products renders them less satisfactory or unsuitable. Furthermore, the particles are characterized by their lack of sharp edges and by their generally rounded contour as compared with calcium sulphate particles from other sources. Thus the product is less abrasive than these other forms and finds especial application where such abrasiveness is undesirable.

My process for preparing this desirable form of calcium sulphate is exceedingly simple and inexpensive in that only two principal steps are involved. The crude sulphate residue obtained in the manufacture of hydrofluoric acid first is washed either batchwise or continuously to remove impurities, especially iron compounds, and then is subjected to calcination.

The crude calcium sulphate residue obtained in hydrofluoric acid manufacture is anhydrous $CaSO_4$ existing in a very finely divided condition and possessing a grayish shade. It contains a small amount of iron and perhaps sulphuric acid remaining from the reaction. To this material I add sufficient water to form a slurry, which is then agitated thoroughly. In this manner lumps formed by coherence of the finely divided particles are broken up and iron present is dissolved. In some cases it may be desirable, especially where a very large amount of iron is present, to add hydrochloric acid to the mixture to assist in dissolving the iron. The water and the calcium sulphate are separated in suitable manner as by settling and decantation, centrifuging, filtering, etc. and additional water is added to and intimately mixed with the calcium sulphate to remove impurities and to eliminate acid from the calcium sulphate. The wash water and calcium sulphate are then separated as in the first step.

In a batch operation this treatment may be repeated three or four times drawing off the clear liquid each time until the acid is substantially completely removed, and the iron content has been reduced to less than 0.10%, preferably less than .025%.

After this washing the calcium sulphate may be filtered to separate remaining solution. The purified calcium sulphate then is dried and is calcined preferably at a temperature between 500 and 700° C.

In this manner there is formed an anhydrous calcium sulphate product of exceeding fineness and uniformity as compared, for example, with natural gypsum that has been ground and passed through a 325 mesh screen. My product is distinguished by the much smaller average particle size, which may be around 2 to 4 microns average diameter, by the notable absence of substantial amounts of particles having a diameter above about 10 microns, by the uniformity of particle size, and by the rounded character of the particles and their freedom from sharp edges such as are found on gypsum particles. The product is white to a very high degree and is especially suitable for use where such a property is desired, for example, in the production of pigments, fillers for cloth, etc. The calcium sulphate of this invention possesses very good covering power and excels the common commercial forms of calcium sulphate in this respect. Hence it is notably adapted for use as an ingredient for paints or paper fillers, diminishing the thickness of coatings necessary to obscure a surface in the one case and improving the opacity of a printed page in the other. It will be evident that the improvement of these properties constitutes a distinct and much sought advance in the art. In addition its high degree of whiteness gives to the coatings or sheets a pleasing appearance and permits their tinting in delicate shades without the production of cloudy or dirty effects. It also serves to advantage as a rubber filling material where its uniformity and freedom from abrasive particles renders it particularly suitable. Gypsum on the other hand, in view of the prevalence of prismatic forms or plates of variant size, is wholly unsuited for such use.

In short, the product of this invention may be used to advantage wherever a product having the above physical properties and the chemical properties of anhydrous CaSO₄ is desirable.

Calcination of washed calcium sulphate containing from 0.0075% up to 0.10% iron is preferably effected at a temperature between 500° and 700° C. At lower temperatures than 500° it becomes more difficult to obtain a product free from grayish cast. At higher temperatures than 700° the product tends to exhibit a pinkish cast which, of course, is undesirable where a maximum degree of whiteness is sought.

The time of heating also exerts an effect upon the color of the product and I have found that a period of about one hour yields an especially white product. Much shorter periods ordinarily do not produce the maximum whiteness and longer periods tend to develop a pinkish cast similar to that obtained with higher temperatures.

It is considered that the tendency of the product to become pink is dependent to some extent upon the content of iron present, and there is less tendency for the pinkish cast to form where less iron is present, so that if a thorough removal of iron is effected in the washing step, correspondingly higher temperature and longer time of calcination may be employed without loss of whiteness in the product. Heating at a higher temperature or for a longer time than required to produce maximum whiteness is not economical, however, and hence not desirable.

The following example illustrates the preferred method of carrying out the invention:

One part by weight of the fresh crude anhydrous calcium sulphate resulting from the treatment of calcium fluoride with 98% sulphuric acid is agitated with 4 parts of water to which has been added 5% by weight of commercial hydrochloric acid (30% HCl) based on the weight of the crude calcium sulphate. The mixture is agitated for about one hour with or without application of heat, but preferably at about 100° C. In this manner iron present is dissolved and any lumps of calcium sulphate formed by coherence of the particles are broken up. The mixture is then settled for sufficient time so that the bulk of the liquid may be drawn off. In normal practice a 2 to 5 hour settling period may be employed. The clear liquid is removed by decantation.

A similar amount of water containing no acid is added, and the mixture is agitated for a few minutes to effect thorough contact with the calcium sulphate. The mixture is then settled and decanted as in the first step. This washing is repeated until the iron content of the calcium sulphate has been reduced to around 0.025% or less. Normally 3 or 4 washings with the acid-free water are sufficient. The calcium sulphate is then filtered to separate the remaining water.

The wet calcium sulphate is dried and finally calcined at a temperature of around 600° C. for about one hour. The calcination may be effected in the same manner and with the same type of equipment as normally employed for the calcination of gypsum. The product then may be ground in a pebble type mill to break up any remaining lumps or oversized particles. The finished product possesses a high degree of whiteness and is composed of exceedingly uniform particles of anhydrous calcium sulphate (CaSO₄) having the above described physical properties.

Various changes in the procedure may of course be employed as will be obvious to those skilled in the art,—for example, the hydrochloric acid may be omitted from the first washing liquid, especially where the crude material contains only small amounts of iron; the washing may be effected at an elevated temperature, say around 100° C. to more rapidly dissolve impurities; the separation may be effected in various ways other than by settling and decantation, for instance, by centrifuging or filtering; instead of grinding the product, the fine particles may be separated from larger lumps, which ordinarily compose only a small percentage, less than 5%, of the total product, and these lumps may be separately ground or may be used for other purposes.

I claim:

1. The method of producing an anhydrous calcium sulphate product possessing a white color of high intensity, which comprises washing the anhydrous calcium sulphate residue obtained in the manufacture of hydrogen fluoride so as to reduce the iron content thereof to not more than about 0.025% by weight, and subjecting the product to a temperature of between 500° C. and 700° C. for about one hour.

2. The method of producing an anhydrous calcium sulphate product possessing a white color of high intensity, which comprises washing with an acidic aqueous solution the anhydrous calcium sulphate residue obtained in the manufacture of hydrogen fluoride so as to reduce the iron content thereof to not more than about 0.025% by weight, and subjecting the product to a temperature of between 500° C. and 700° C. for about one hour.

3. The method of producing an anhydrous calcium sulphate product possessing a white color of high intensity, which comprises washing with an aqueous solution containing hydrochloric acid the anhydrous calcium sulphate residue obtained in the manufacture of hydrogen fluoride so as to reduce the iron content thereof to not more than about 0.025% by weight, rinsing the product with acid-free water to remove the acid, removing water from the acid-free sulphate, and then subjecting the product to a temperature of between 500° C. and 700° C. for about one hour.

4. An anhydrous calcium sulphate product of uniform particle size having an average particle diameter of around 2 to 4 microns and containing no substantial amount of particles larger than about 10 microns in diameter, said product being of generally rounded contour and substantially free from sharp-edged particles.

5. The method of producing an anhydrous calcium sulphate product, which comprises washing the crude grayish calcium sulphate residue from the reaction of concentrated sulphuric acid upon calcium fluoride and subjecting the product to a temperature between 500° C. and 700° C. until the grayish shade of the product disappears.

6. The method of producing an anhydrous calcium sulphate product, which comprises washing the anhydrous calcium sulphate residue obtained in the manufacture of hydrogen fluoride so as to reduce the iron content thereof to not more than about 0.025% by weight and subjecting the product to a temperature of between 500° C. and 700° C. until the product becomes an intense white.

DAVIDSON CHARLTON WYSOR.